United States Patent
Bortolon et al.

(10) Patent No.: US 8,371,188 B2
(45) Date of Patent: Feb. 12, 2013

(54) TRANSMISSION CONTROL ASSEMBLY HAVING A LOCKING MECHANISM

(75) Inventors: Christopher Bortolon, Commerce Township, MI (US); William McDonald, Shelby Township, MI (US)

(73) Assignee: Kongsberg Driveline Systems I, Inc., Troy, MI (US)

( * ) Notice: Subject to any disclaimer, the term of this patent is extended or adjusted under 35 U.S.C. 154(b) by 1027 days.

(21) Appl. No.: 12/244,029

(22) Filed: Oct. 2, 2008

(65) Prior Publication Data

US 2010/0083784 A1 Apr. 8, 2010

(51) Int. Cl.
*B60K 20/00* (2006.01)
*G05G 5/00* (2006.01)
*F16H 59/04* (2006.01)

(52) U.S. Cl. .................... 74/473.21; 74/473.33

(58) Field of Classification Search ............. 74/473.1, 74/473.11, 473.13, 473.18, 473.21, 473.23, 74/473.25, 473.3, 473.33
See application file for complete search history.

(56) References Cited

U.S. PATENT DOCUMENTS

| | | | | | |
|---|---|---|---|---|---|
| 2,174,950 | A | * | 10/1939 | Salassi | 74/337.5 |
| 2,177,212 | A | * | 10/1939 | Evrell | 192/3.62 |
| 3,292,450 | A | * | 12/1966 | Hurst et al. | 74/473.18 |
| 3,704,982 | A | * | 12/1972 | Hobbins | 74/473.18 |
| 3,757,600 | A | * | 9/1973 | Bieber | 74/473.18 |
| 4,326,432 | A | * | 4/1982 | Miller | 74/473.18 |
| 4,960,008 | A | * | 10/1990 | Yen et al. | 74/473.18 |
| 5,056,376 | A | * | 10/1991 | Moroto et al. | 74/335 |
| 5,070,740 | A | * | 12/1991 | Giek et al. | 74/473.18 |
| 5,622,079 | A | * | 4/1997 | Woeste et al. | 74/335 |
| 5,689,996 | A | * | 11/1997 | Ersoy | 74/335 |
| 5,791,197 | A | * | 8/1998 | Rempinski et al. | 74/473.18 |
| 5,845,535 | A | * | 12/1998 | Wakabayashi et al. | 74/473.18 |
| 5,862,708 | A | * | 1/1999 | Shamoto | 74/473.18 |
| 5,899,115 | A | * | 5/1999 | Kataumi et al. | 74/473.18 |
| 5,934,145 | A | * | 8/1999 | Ersoy et al. | 74/473.18 |
| 6,058,795 | A | * | 5/2000 | Ottenbruch et al. | 74/473.18 |
| 6,098,483 | A | * | 8/2000 | Syamoto et al. | 74/473.18 |
| 6,148,686 | A | * | 11/2000 | Kataumi | 74/473.18 |
| 6,230,579 | B1 | | 5/2001 | Reasoner et al. | |
| 6,282,973 | B1 | * | 9/2001 | Sander et al. | 74/473.18 |
| 6,295,886 | B1 | | 10/2001 | Russell | |
| 6,401,564 | B1 | * | 6/2002 | Lee | 74/473.18 |
| 6,865,967 | B2 | * | 3/2005 | Shioji et al. | 74/473.23 |
| 6,895,833 | B2 | * | 5/2005 | Cho | 74/473.18 |
| 7,028,576 | B2 | * | 4/2006 | Zelman | 74/473.18 |
| 7,174,802 | B2 | * | 2/2007 | Wakayama | 74/473.35 |
| 2004/0031346 | A1 | | 2/2004 | Kahara | |
| 2005/0223834 | A1 | * | 10/2005 | Otsuka | 74/473.18 |
| 2007/0137362 | A1 | * | 6/2007 | Kortge et al. | 74/473.18 |
| 2008/0098844 | A1 | * | 5/2008 | Kato et al. | 74/473.18 |

* cited by examiner

OTHER PUBLICATIONS

Partial European Search Report, EP09012482, Feb. 1, 2010, 1 page.

*Primary Examiner* — Justin Krause
(74) *Attorney, Agent, or Firm* — Howard & Howard Attorneys PLLC

(57) ABSTRACT

A transmission control assembly having a housing and a bracket pivotally coupled to the housing for movement along a first path. A yoke is selectively coupled to the bracket for concurrent movement with the bracket along the first path. The yoke is also selectively pivotal about a second pivot axis substantially transverse to the first pivot axis for movement along a second path. A tactile device is supported by the bracket and engageable with the housing. The tactile device moves about the bracket during the movement of the bracket along the first path. A locking mechanism is coupled between the bracket and the yoke. The locking mechanism moves between an unlocked position when the yoke is coupled to the bracket for allowing movement of the tactile device and a locked position engaged with the tactile device when the yoke moves along the second path for preventing movement of the tactile device.

18 Claims, 6 Drawing Sheets

TRANSMISSION CONTROL ASSEMBLY HAVING A LOCKING MECHANISM

FIELD OF THE INVENTION

The present invention relates generally to transmission control assemblies having locking mechanisms for preventing unwanted movement of a shifter.

BACKGROUND OF THE INVENTION

Some currently available automobiles are equipped with manual (i.e., standard) transmissions that require drivers to operate a clutch and to manually shift gears while driving. Some other currently available automobiles are equipped with automatic transmissions where gear shifting is automated.

Relatively recently, a market has been identified for automobiles that allow drivers to decide, each time that a driver takes the wheel, whether to operate the automobile's transmission automatically or in an alternate mode that, to some extent, simulates operating the transmission in a manual mode. For example, manual low gear shifting system modes, such as the TIPTRONIC mode found in PORSCHE automobiles, the STEPTRONIC mode found in BMW automobiles, etc., are currently available.

More specifically, in a manual low gear shifting system mode, the driver is provided with a first shift gate that includes shifter positions such as "Park", "Reverse", "Neutral", "Drive", etc. However the driver is also provided with a second shift gate that allows the driver to bypass the automatic transmission mode and to manually initiate an "upshift" or "downshift" from one gear to another.

In a manual low gear shifting system mode, the driver takes over most of the shifting decisions ordinarily performed by a controlled device of an automatic transmission. Thus, the driver may delay an upshift in order to obtain increased acceleration or may initiate the onset of a downshift in order to increase the braking effect of the engine. In view of this relatively recently identified market, devices, systems, and methods have been developed that allow for drivers to switch between automatic and alternate transmission operation, such as, for example, operation in a manual low gear shifting system mode.

The above-discussed manual low gear shifting system mode is typically activated/engaged while the automatic transmission is in a low gear setting. At least for this reason, what is needed are novel devices, systems, and methods that minimize the likelihood of any of the components of the automatic transmission moving out of their low gear settings without the driver's knowledge and/or consent (e.g., without the driver having made a conscious decision to switch out of the manual low gear shifting system mode and back into the automatic mode).

What is also needed are novel devices and systems that allow for the switching of the mode of operation of an automotive transmission between a manual low gear shifting system mode and an automatic mode, yet that are relatively inexpensive, lightweight, and/or that are made up of relatively few components.

SUMMARY OF THE INVENTION

A transmission control assembly having a housing. A bracket is pivotally coupled to the housing about a first pivot axis for movement along a first path. A yoke is selectively coupled to the bracket for concurrent movement with the bracket along the first path. The yoke is also selectively pivotal about a second pivot axis substantially transverse to the first pivot axis for movement along a second path. A tactile device is supported by the bracket and engageable with the housing. The tactile device moves about the bracket during the movement of the bracket along the first path. A locking mechanism is coupled between the bracket and the yoke. The locking mechanism moves between an unlocked position when the yoke is coupled to the bracket for allowing movement of the tactile device and a locked position engaged with the tactile device when the yoke moves along the second path for preventing movement of the tactile device.

Accordingly, the design of the subject invention minimizes the likelihood of any of the components of the automatic transmission moving out of a predetermined gear setting without the driver's knowledge and/or consent. Further, the design of the subject invention uses few additional parts and is therefore relatively inexpensive, lightweight, and made up of relatively few components.

DETAILED DESCRIPTION

Figure 1:
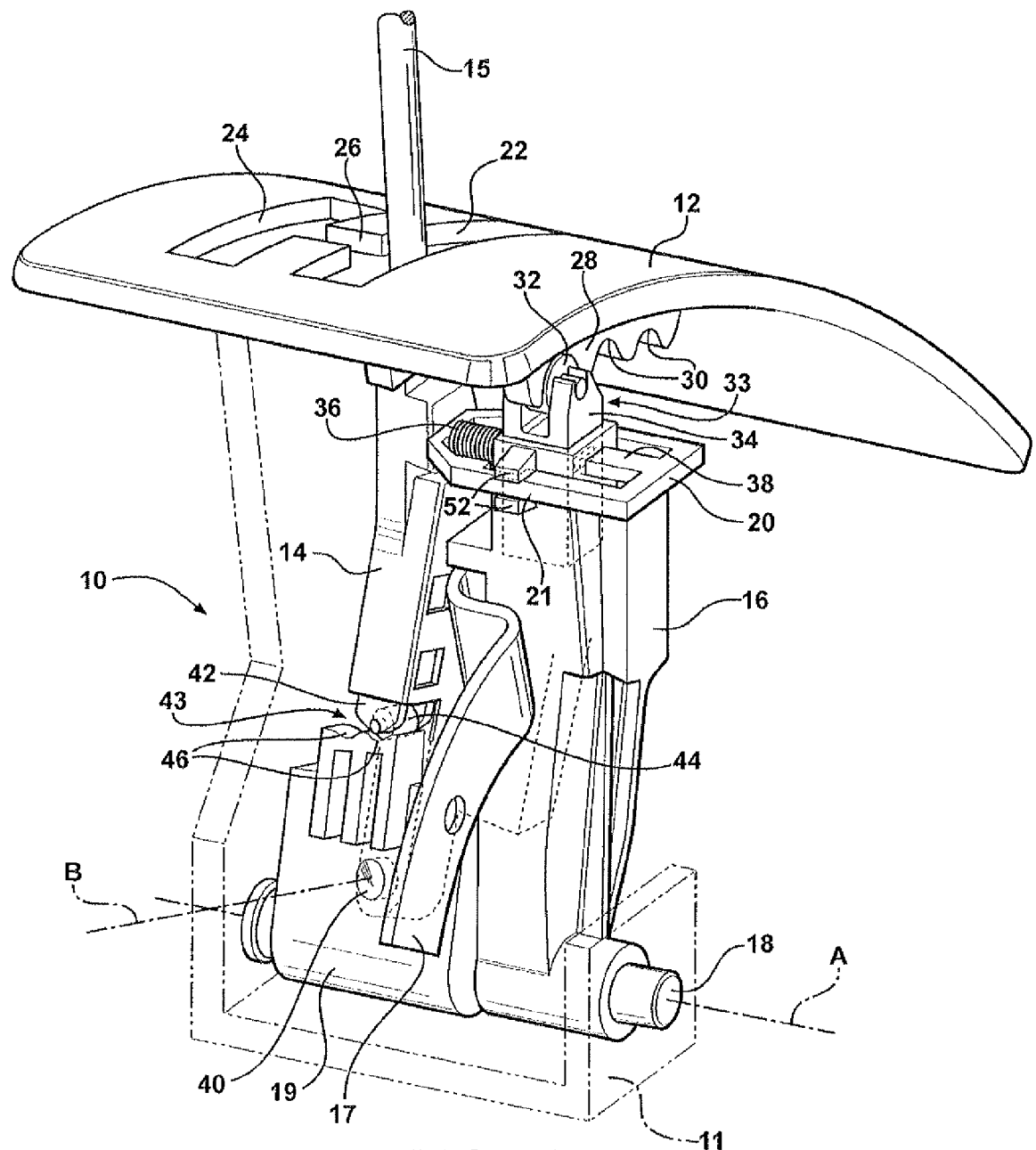
FIG. 1 is a perspective view of a transmission control assembly in an automatic transmission mode.
Figure 2:
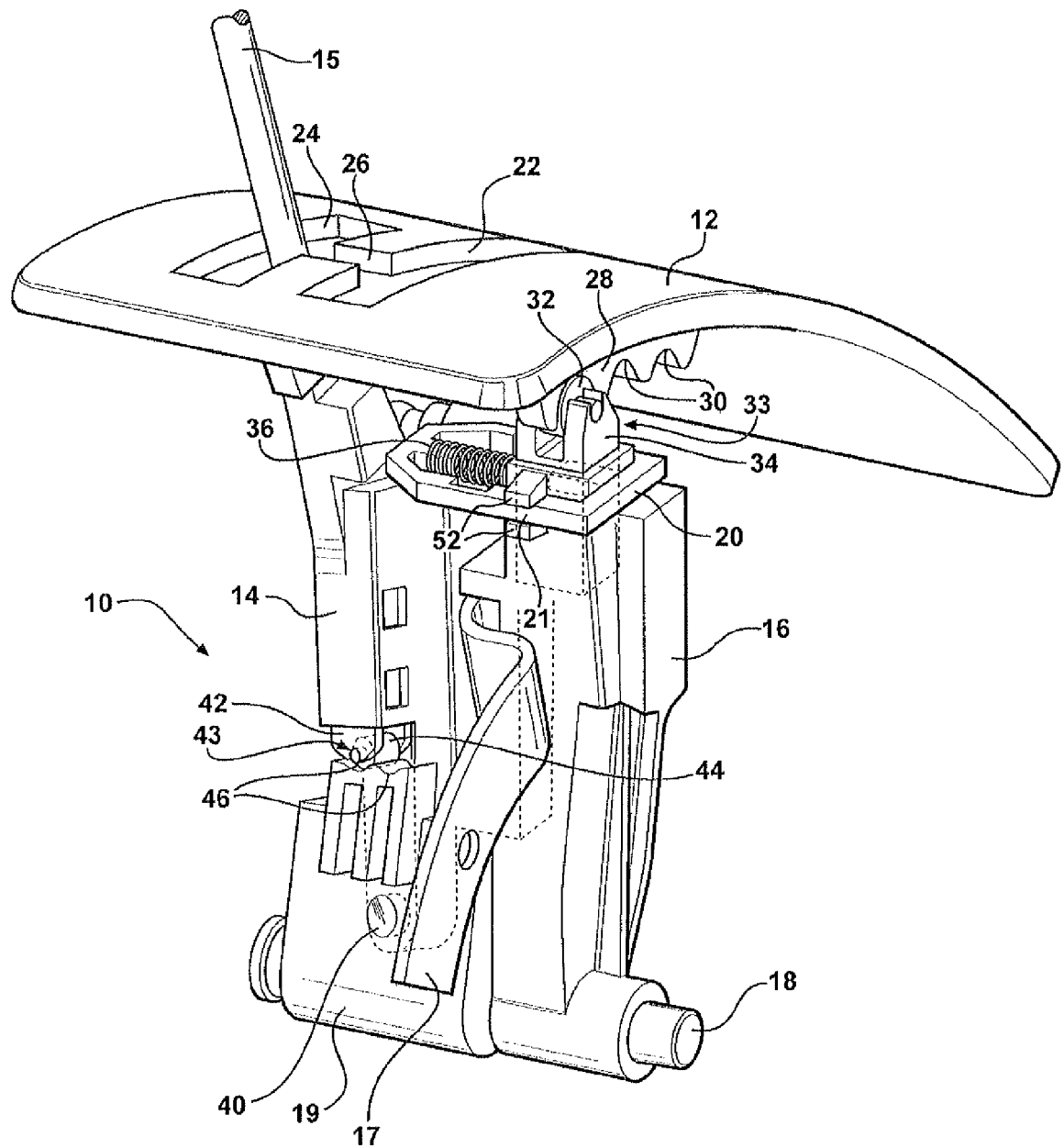
FIG. 2 is a perspective view of the transmission control assembly in a manual shifting mode with a shifter in a neutral position.
Figure 3:
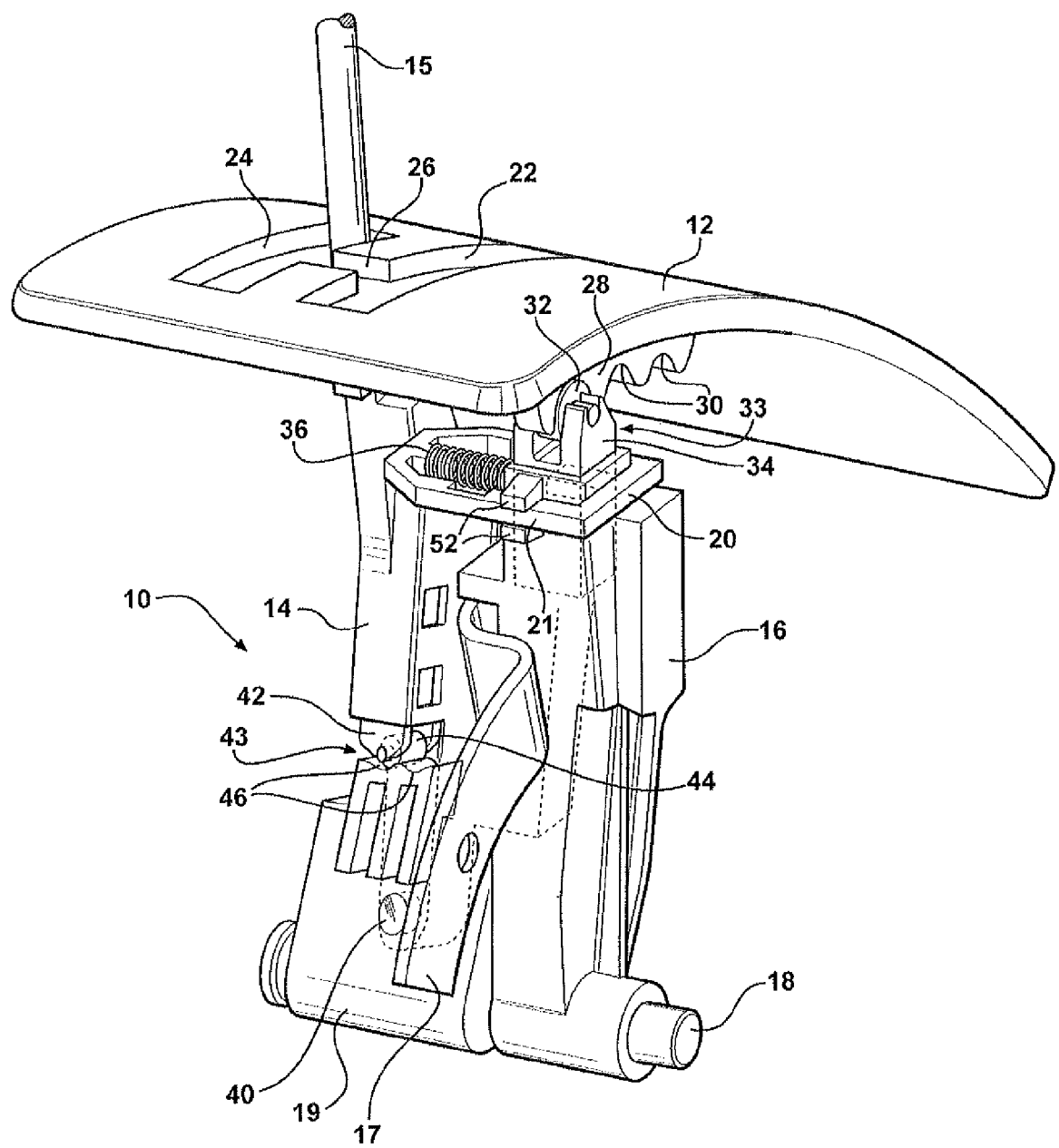
FIG. 3 is a perspective view of the transmission control assembly in the manual shifting mode with the shifter in an up-shift position.

The invention will now be described with reference to the drawing figures, in which like reference numerals refer to like parts throughout. FIGS. 1-3 illustrate perspective views of a transmission control assembly 10 according to a first embodiment of the present invention. FIG. 1 illustrates the transmission control assembly 10 operating in an automatic transmission mode. In other words, when the components of the transmission control assembly 10 are positioned as illustrated in FIG. 1, a driver of an automobile that includes the transmission control assembly 10 need not manually shift gears while driving. Rather, the driver may simply select automatic transmission setting such as, for example, PARK, REVERSE, NEUTRAL, DRIVE, or LOW (or OVERDRIVE, L1, L2, etc.). For reference, it should be noted that the transmission control assembly 10 is set at LOW in FIG. 1.

The transmission control assembly 10 illustrated in FIGS. 1-3 includes a housing 11, a lid 12, a yoke 14, a bracket 16, a main pin 18, a pivot block 19, a locking mechanism 20, a rooster comb 28, a plurality of detents 30, a roller 32, and a plunger 34. The housing 11 is shown schematically and the lid 12 is mounted to the housing 11 in any known fashion. The rooster comb 28 is positioned underneath the lid 12 and includes the plurality of detents 30. The roller 32 is positioned in one of the detents 30 and sits atop the plunger 34. In turn, the plunger 34 extends into the bracket 16, which itself is supported by the main pin 18. The bracket 16 is pivotally coupled to the housing 11 about a first pivot axis A for movement along a first path. Also supported by the main pin 18 and adjacent to the bracket 16 is the pivot block 19. The yoke 14 is then positioned atop the pivot block 19 and is located adjacent to the lid 12. The yoke 14 is selectively coupled to the bracket 16 for concurrent movement with the bracket 16 along the first path. The yoke 14 is also selectively pivotal about a second pivot axis B substantially transverse to the first pivot axis A for movement along a second path. Also, the locking mechanism 20 is selectively engaged by the yoke 14 and surrounds a portion of the bracket 16 and plunger 34.

According to certain embodiments of the present invention, a shifter 15 or other protrusion is fixedly connected to the yoke 14. This shifter 15 extends through the lid 12 and may be manually moved by the driver. As will be discussed below, this shifter 15 allows the driver to operate the transmission control assembly 10 by causing movement of the yoke 14 and, because of the above-mentioned inter-connections, of other components in the assembly 10. The operation of the transmission control assembly 10 in both the manual shifting mode and automatic transmission mode will be discussed once the components of the assembly 10 have been identified and discussed.

According to certain embodiments of the present invention, a cable, rod, or other connection (not shown) is fixedly attached to the bracket 16. Specifically, the cable, rod, etc. is attached to a flange 17 extending from the bracket 16. The cable links the bracket 16 to a controller (not illustrated) that is configured to control the automobile's transmission based on movement of the cable, the bracket 16, and/or of some other component(s) in the transmission control assembly 10. For example, when the driver moves the shifter 15, the bracket 16 is moved by the shifter 15. Hence, the cable, rod, or other connection attached to the bracket 16 also moves. Thus, the distance and direction of the movement of the cable and/or bracket 16 may be detected by the controller and the controller may then cause the automobile's transmission to react accordingly.

For example, when operating in the automatic transmission mode, when the shifter 15 is moved from a position that corresponds to the PARK setting to a position that corresponds to the REVERSE setting, the bracket 16 will be moved by the shifter 15. Once the bracket 16 moves, the cable, rod or other connection attached thereto will also move a predetermined distance in a predetermined direction. The controller will detect the amount and direction of the movement either directly or through the use of position sensors located in the automobile (e.g., at various locations adjacent to the lid 12). The controller will then cause the transmission, which had been idling in the PARK setting, to engage such that the automobile will be able to move rearward.

As mentioned above and illustrated in FIG. 1, the rooster comb 28 includes the plurality of detents 30 and is positioned immediately beneath the lid 12. In other words, the housing 11 includes a series of detents 30. As also mentioned above, the roller 32 is positioned in one of the detents 30 and is supported by the plunger 34 that sits within the bracket 16. The plunger 34 and roller 32 form a tactile device 33 that is supported by the bracket 16 and engageable with the housing 11 with the tactile device 33 moving about the bracket 16 during the movement of the bracket 16 along the first path. As such, the roller 32 engages the detents 30 as the bracket 16 moves along the first path. The bracket 16 includes a cavity with the plunger 34 being movable supported in the cavity. A spring 48 is disposed in the cavity and engages the plunger 34 to continuously bias the roller 32 into engagement with the detents 30.

The bracket 16 is supported by the main pin 18 and is capable of pivoting about the first pivot axis A of the main pin 18. The main pin 18 also supports the pivot block 19, which is also capable of pivoting about the first pivot axis A of the main pin 18. Stated another way, the pivot block 19 is pivotally coupled about the first pivot axis A for concurrent movement with the bracket 16 along the first path. The pivot block 19 is also pivotally coupled about the first pivot axis A for independent movement relative to the bracket 16 along a third path.

Figure 6:
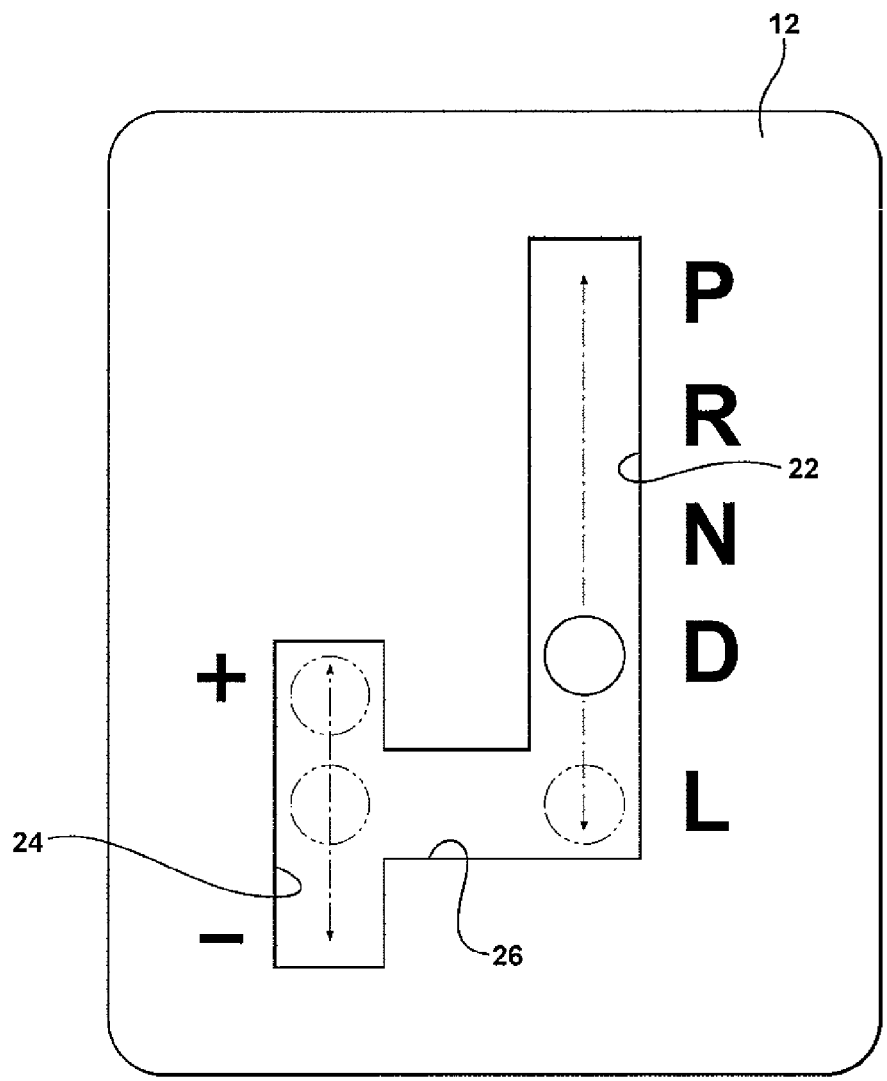
FIG. 6 is a plan view of a lid of a housing.

FIG. 6 illustrates a top view of the transmission control assembly 10 illustrated in FIGS. 1-3. More specifically, FIG. 6 illustrates the lid 12 having an automatic transmission track 22, a manual shifting track 24, and a transition track 26 that can each accommodate movement of the shifter 15 therein. Specifically, the first path defines the automatic transmission track 22, the third path defines the manual shifting track 24 and the second path defines the transition track 26. When operating in an automatic transmission mode, the shifter 15 is moved by the driver between the PARK, "P", REVERSE, "R", NEUTRAL, "N", DRIVE, "D", and LOW "L" positions identified on the automatic transmission track 22. Of course, according to other embodiments of the present invention, the automatic transmission track 22 also includes other positions (e.g., L1, L2, OVERDRIVE). When the shifter 15 is in the "L" or "D" position, the driver may then move the shifter 15 through the transition track 26 and into the manual shifting track 24. In the most preferred embodiment, the first path and third path are substantially parallel to each other.

Once in the manual shifting track 24, the driver may move the shifter 15 toward the up-shift "+" position or the down-shift "−" position one or more times in succession in order to manually shift into higher or lower gears. According to certain embodiments of the present invention, electronic or mechanical sensors (e.g., leaf spring sensors) are positioned at or near the proximate and distal ends of the manual shifting track 24 illustrated in FIG. 6. Then, whenever the shifter 15 is positioned near one of these sensors, the controller receives a signal from the sensor and the automobile's transmission is shifted according to the signal.

When the transmission control assembly 10 is operating in the automatic transmission mode illustrated in FIG. 1, as the driver moves the shifter 15 between positions identified in the automatic transmission track 22, the plunger 34 first moves down away from and then up toward the lid 12. This motion of the plunger 34 allows the roller 32 to move to a new detent 30 in the rooster comb 28 that corresponds to the new shift position.

The plunger 34 is capable of undergoing this type of up and down motion because, as mentioned above, the plunger 34 is supported by a substantially vertical spring 48 included in the bracket 16. The plunger 34 is also capable of undergoing this type of motion because the locking mechanism 20 is disengaged from the plunger 34. More specifically, a tab 38 located on the locking mechanism 20 is not engaged with a notch 39 located on an exterior surface of the plunger 34 and therefore the plunger 34 is not restricted from moving up and down relative to the rooster comb 28.

Figure 4:
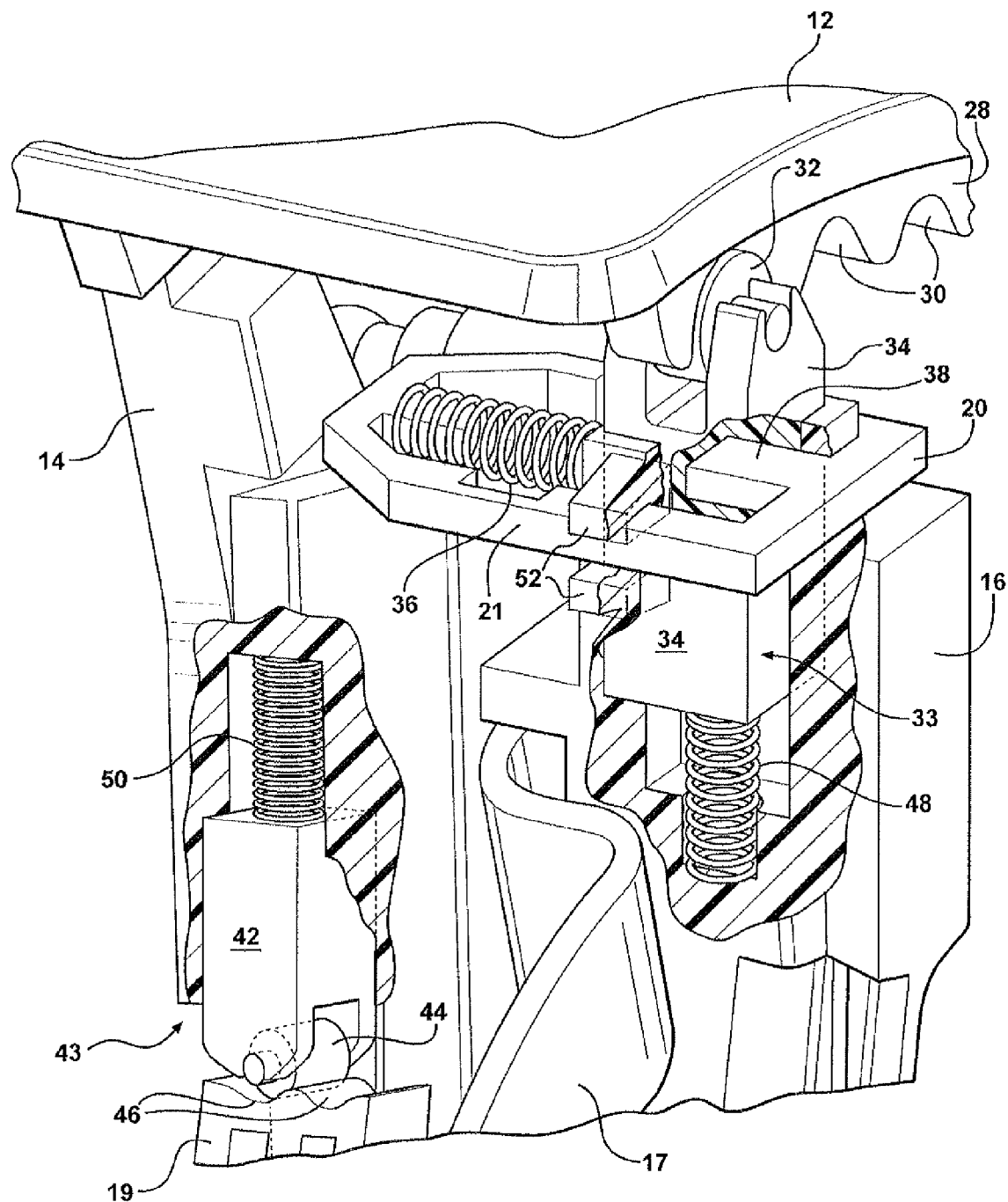
FIG. 4 is a fragmented partially cross-sectional perspective view of a locking mechanism, a tactile device and a second tactile device of the transmission control assembly.
Figure 5:
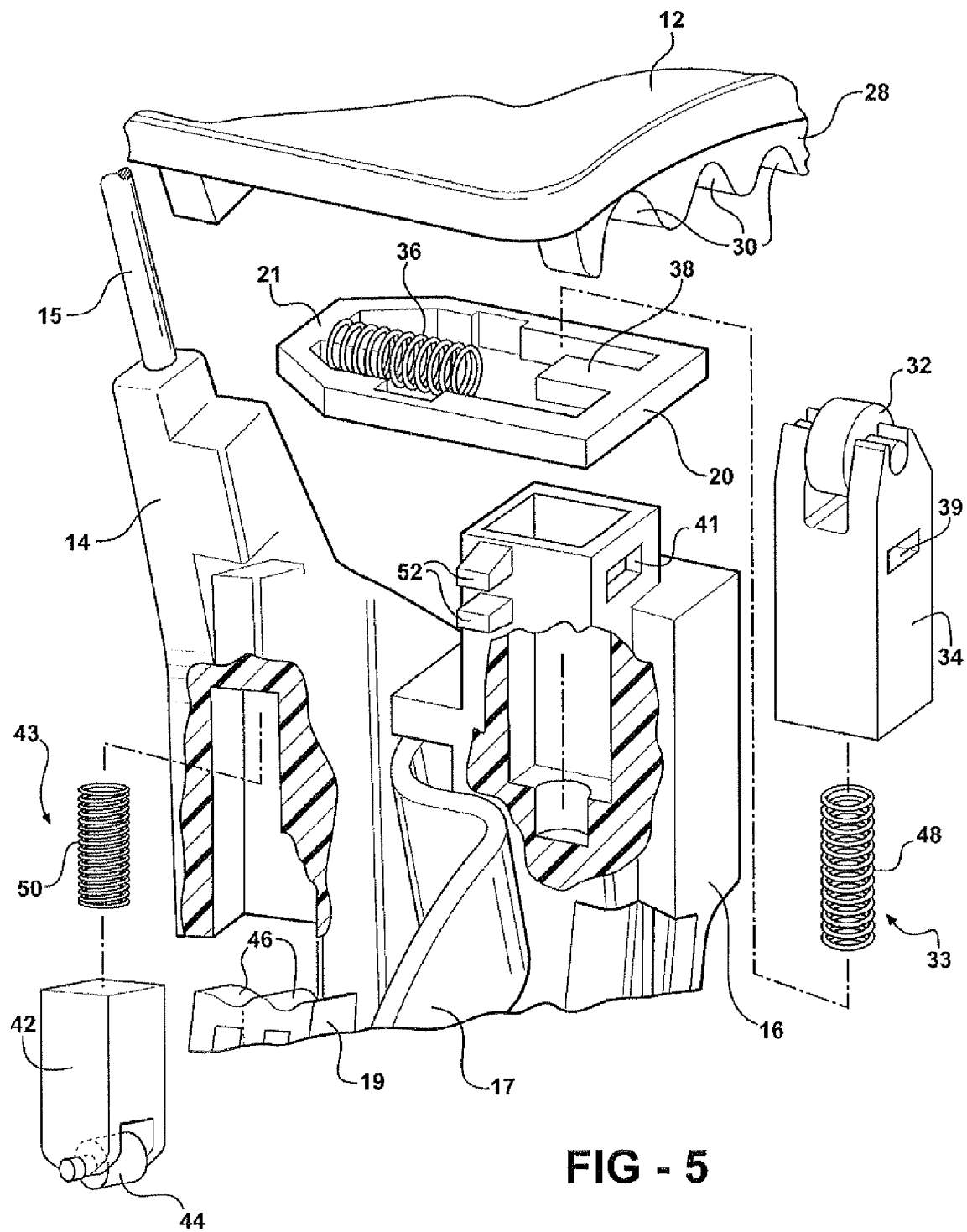
FIG. 5 is an exploded partially cross-sectional perspective view of the components shown in FIG. 4.

Referring also to FIGS. 4 and 5, the locking mechanism 20 is coupled between the bracket 16 and the yoke 14. The locking mechanism 20, according to certain embodiments of the present invention, is preferably supported by being positioned adjacent to one or more ledges 52 around the outside of the bracket 16. Such ledges 52 enhance the stability of the overall system by stabilizing the motion of the locking mechanism 20 (i.e., by reducing or substantially eliminating vibration of the locking mechanism 20 as the locking mechanism 20 moves, thereby reducing noise in the assembly 10).

As shown, the ledges 52 may be formed as a pair of blocks 52 with a pair of blocks 52 projecting from each side of the bracket 16 to capture the locking mechanism 20. The ledges 52, however, may be of any suitable design or configuration. The locking mechanism 20 preferably includes a recess for allowing the mechanism 20 to be installed over one of the blocks 52. During operation, the recess remains off-set from the blocks 52 such that the mechanism 20 remains retained within the blocks 52.

The locking mechanism 20 is movable between an unlocked position when the yoke 14 is coupled to the bracket 16 for allowing movement of the tactile device 33 (see FIG. 1) and a locked position engaged with the tactile device 33 when the yoke 14 moves along the second path for preventing movement of the tactile device 33 (see FIGS. 2 and 3). As discussed above, the locking mechanism 20 includes the tab 38 for engagement with the tactile device 33. As also discussed above, the tactile device 33 includes a notch 39 in the plunger 34 with the tab 38 engaging the notch 39. The bracket 16 preferably includes an aperture 41 that is selectively aligned with the notch 39 with the tab 38 passing through the aperture 41 for engagement with the notch 39. The aperture 41 is aligned with the notch 39 when the roller 32 is seated in one of the detents 30.

The locking mechanism 20 is further defined as having a body portion 21 flanking the bracket 16 and supporting the tab 38. Preferably, sections of the body portion 21 would engage and ride within the ledges 52 of the bracket 16. A biasing device 36 is coupled to the body portion 21 of the locking mechanism 20 to continuously bias the locking mechanism 20 to the unlocked position. The body portion 21 preferably includes a first end supporting the tab 38 and a second end engaging the biasing device 36. The biasing device 36 is preferably a spring.

When switching from the above-discussed automatic transmission mode to the manual shifting mode, the shifter 15, as it moves across the transition track 26, tips the yoke 14 away from the bracket 16. The yoke 14 is pivotally mounted to the pivot block 19 about the second pivot axis B for movement relative to the pivot block 19 along the second path. According to certain embodiments of the present invention, the yoke 14 is tipped approximately 8.5 degrees further away from the bracket 16 than when the assembly 10 is operating in the automatic transmission mode. However, greater and lesser degrees of tilt are also within the scope of the present invention. The yoke 14 pivots about a secondary pin 40 that extends through a portion of the pivot block 19.

The yoke 14 preferably has a yoke plunger 42 included therein that itself rests upon a substantially vertical spring 50 located in the yoke 14. The yoke plunger 42 has a yoke roller 44 located at the distal end thereof. The yoke plunger 42 and yoke roller 44 form a second tactile device 43, which is supported by the yoke 14 and engageable with the pivot block 19. The yoke 14 includes a cavity with the yoke plunger 42 disposed in the cavity. The pivot block 19 includes a series of yoke detents 46. The yoke roller 44 rests in one of two yoke detents 46 and is movable through these detents 46 during the movement of the yoke 14 along the second path. The particular yoke detent 46 depends on whether the assembly 10 is being operated in the manual shifting mode or automatic transmission mode. The spring 50 is also disposed in the cavity and engages the yoke plunger 42 to continuously bias the yoke roller 44 into engagement with the yoke detents 46. The second tactile device 43 provides additional mechanical stability to the assembly 10 by preventing unwanted movement of the yoke 14.

Because, according to certain embodiments of the present invention, the locking mechanism 20 is supported by the bracket 16, the tab 38 of the locking mechanism 20 slides into the notch 39 of the plunger 34 when the yoke 14 is tilted away from the bracket 16. Preferably, the biasing device 36 automatically moves the tab 38 of the locking mechanism 20 into the notch 39 when the yoke 14 pivots about the second pivot axis B. This is particularly clearly shown in FIG. 4, which illustrates a close-up perspective view of the transmission control assembly 10 wherein a portion of the locking mechanism 20 (i.e., the tab 38) is engaged with the plunger 34. In the transmission control assembly 10 discussed herein, the biasing device 36, which is preferably a spring 36, is in a compressed position when the assembly 10 is operating in the automatic transmission mode. When the yoke 14 is tipped over to the manual shifting mode, the spring 36 is elongated and exerts a biasing or pulling force upon the locking mechanism 20 in the direction of the aperture 41 of the bracket 16. When the shifter 15 is moved back into the automatic transmission track 22 after being in the manual shifting track 24, the yoke 14 engages the body portion of the locking mechanism to push the tab 38 out of the notch 39 and simultaneously compress the spring 36. This once again allows the plunger 34 to travel up and/or down relative to the lid 12 and the roller 32 to travel along the rooster comb 28.

As mentioned above, the insertion of the tab 38 into the notch 39 restricts the plunger 34 from being able to travel up and/or down relative to the lid 12. As such, when the shifter 15 is traveling along the manual shifting track 24, the roller 32 cannot move from one detent 30 to another. Therefore, when the transmission control assembly 10 is operating in a manual low gear shifting system mode, the roller 32, which is coupled to the bracket 16, remains in the detent 30 that corresponds to the "L" position on the automatic transmission track 22. This is particularly desirable because the cable is subject to tension loading, such as when an automobile is being driven over rough terrain, and the plunger 34 could otherwise be sufficiently jolted to cause the roller 32 to undesirably move to another location on the rooster comb 28, thereby potentially causing damage to the transmission.

As alluded to above, it would be desirable for transmission control assemblies according to certain embodiments of the present invention to be relatively inexpensive and/or lightweight. As such, according to certain embodiments of the present invention, some or all of the components included in the transmission control assembly 10 discussed above are made from polymeric materials. According to other embodiments of the present invention, the locking mechanism 20 is made from a cast metal, which is relatively inexpensive. However, components made from all different types of materials are within the scope of the present invention.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:
1. A transmission control assembly, comprising:
a housing;
a bracket pivotally coupled to said housing about a first pivot axis for movement along a first path;

a yoke selectively coupled to said bracket for concurrent movement with said bracket along said first path and selectively pivotal about a second pivot axis substantially transverse to said first pivot axis for movement along a second path;

a tactile device supported by said bracket and engaging said housing with said tactile device moving relative to said bracket and said housing during said movement of said bracket along said first path; and a locking mechanism coupled between said bracket and said yoke with said locking mechanism movable between an unlocked position disengaged from said tactile device when said yoke is coupled to said bracket for allowing movement of said tactile device relative to said bracket and said housing, and a locked position directly engaged with said tactile device when said yoke moves along said second path for preventing movement of said tactile device relative to said bracket and said housing.

2. A control assembly as set forth in claim 1 wherein said locking mechanism includes a tab for engagement with said tactile device.

3. A control assembly as set forth in claim 2 wherein said tactile device includes a plunger having a notch with said tab engaging said notch.

4. A control assembly as set forth in claim 3 wherein said bracket includes an aperture that is selectively aligned with said notch with said tab passing through said aperture for engagement within said notch.

5. A control assembly as set forth in claim 2 wherein said locking mechanism includes a body portion flanking said bracket and supporting said tab.

6. A control assembly as set forth in claim 5 further including a biasing device coupled to said body portion of said locking mechanism to continuously bias said locking mechanism to said unlocked position.

7. A control assembly as set forth in claim 6 wherein said body portion includes a first end supporting said tab and a second end engaging said biasing device.

8. A control assembly as set forth in claim 1 wherein said housing includes a lid having a series of detents and said tactile device includes a plunger supporting a roller with said roller engaging said detents as said bracket moves along said first path.

9. A control assembly as set forth in claim 8 wherein said bracket includes a cavity with said plunger being movably supported in said cavity.

10. A control assembly as set forth in claim 9 further including a spring disposed in said cavity and engaging said plunger to continuously bias said roller into engagement with said detents.

11. A control assembly as set forth in claim 1 further including a pivot block pivotally coupled about said first pivot axis for concurrent movement with said bracket along said first path and for independent movement relative to said bracket along a third path.

12. A control assembly as set forth in claim 11 wherein said yoke is pivotally mounted to said pivot block about said second pivot axis for movement relative to said pivot block along said second path.

13. A control assembly as set forth in claim 12 wherein said first path defines an automatic transmission track, said third path defines a manual shifting track and said second path defines transition track.

14. A control assembly as set forth in claim 13 wherein said first path and said third path are substantially parallel to each other.

15. A control assembly as set forth in claim 12 further including a second tactile device supported by said yoke and engageable with said pivot block.

16. A control assembly as set forth in claim 15 wherein said pivot block includes a series of yoke detents and said second tactile device includes a yoke roller moveable through said detents during said movement of said yoke along said second path.

17. A control assembly as set forth in claim 16 wherein said yoke includes a cavity and said second tactile device includes a yoke plunger supporting said yoke roller with said yoke plunger disposed in said cavity.

18. A control assembly as set forth in claim 17 further including a spring disposed in said cavity and engaging said yoke plunger to continuously bias said yoke roller into engagement with said detents.

* * * * *